(12) United States Patent
Ebert

(10) Patent No.: US 10,047,810 B2
(45) Date of Patent: Aug. 14, 2018

(54) BRAKE CALIPER FOR A DISC BRAKE

(71) Applicant: KNORR-BREMSE Systeme fuer Nutzfahrzeuge GmbH, Munich (DE)

(72) Inventor: Joerg Ebert, Cologne (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 19 days.

(21) Appl. No.: 15/095,723

(22) Filed: Apr. 11, 2016

(65) Prior Publication Data
US 2016/0223037 A1 Aug. 4, 2016

Related U.S. Application Data

(63) Continuation of application No. PCT/EP2014/071715, filed on Oct. 10, 2014.

(30) Foreign Application Priority Data

Oct. 11, 2013 (DE) ........................ 10 2013 111 258

(51) Int. Cl.
F16D 55/22 (2006.01)
F16D 65/00 (2006.01)
(Continued)

(52) U.S. Cl.
CPC ......... F16D 65/0075 (2013.01); F16D 55/22 (2013.01); F16D 55/225 (2013.01);
(Continued)

(58) Field of Classification Search
CPC ............. F16D 65/0068; F16D 65/0075; F16D 65/092; F16D 65/095; F16D 55/225
(Continued)

(56) References Cited

U.S. PATENT DOCUMENTS 3,506,097 A * 4/1970 Hollnagel ........... F16D 55/2255
188/71.7
3,933,226 A 1/1976 Maurice
(Continued)

FOREIGN PATENT DOCUMENTS

CN 1737399 A 2/2006
CN 1865727 A 11/2006
(Continued)

OTHER PUBLICATIONS

International Search Report (PCT/ISA/210) issued in PCT Application No. PCT/EP2014/071715 dated Jan. 22, 2015 with English translation (Four (4) pages).
(Continued)

Primary Examiner — Christopher P Schwartz
(74) Attorney, Agent, or Firm — Crowell & Moring LLP

(57) ABSTRACT

A brake caliper is provided for a disc brake. The brake caliper has a caliper frame which is designed to extend over an edge of a brake disc and which includes a housing for accommodating an application mechanism for applying the disc brake. The housing has a base plate, an intermediate plate, a housing shell interconnecting the base plate and the intermediate plate, and a housing cover. The caliper frame is cut from sheet metal and shaped and the housing cover is integrally formed with the caliper frame.

20 Claims, 5 Drawing Sheets

(51) Int. Cl.
*F16D 55/226* (2006.01)
*F16D 55/227* (2006.01)
*F16D 65/18* (2006.01)
*F16D 55/225* (2006.01)
*F16D 55/00* (2006.01)
*F16D 121/02* (2012.01)

(52) U.S. Cl.
CPC ......... *F16D 55/226* (2013.01); *F16D 55/227* (2013.01); *F16D 65/18* (2013.01); *F16D 2055/002* (2013.01); *F16D 2055/0008* (2013.01); *F16D 2055/0016* (2013.01); *F16D 2121/02* (2013.01); *F16D 2200/0021* (2013.01); *F16D 2250/0023* (2013.01); *F16D 2250/0076* (2013.01)

(58) Field of Classification Search
USPC .......................... 188/72.4, 72.9, 73.31, 73.39
See application file for complete search history.

(56) References Cited

U.S. PATENT DOCUMENTS

| | | | | |
|---|---|---|---|---|
| 5,927,445 | A * | 7/1999 | Bieker | F16D 55/226 188/71.1 |
| 6,659,235 | B2 * | 12/2003 | Ortegren | F16D 65/183 188/71.1 |
| 6,811,004 | B1 * | 11/2004 | McCann | F16D 65/0043 188/72.9 |
| 2005/0098395 | A1 | 5/2005 | Larsson et al. | |
| 2006/0037821 | A1 | 2/2006 | Barbosa et al. | |
| 2006/0113152 | A1 * | 6/2006 | Gripemark | F16D 55/24 188/72.3 |
| 2007/0084681 | A1 | 4/2007 | Roberts | |
| 2010/0170755 | A1 * | 7/2010 | Biggs | F16D 55/224 188/72.4 |
| 2012/0298456 | A1 | 11/2012 | Morris et al. | |
| 2013/0081911 | A1 | 4/2013 | Suh | |
| 2013/0240305 | A1 * | 9/2013 | Thomas | F16D 65/183 188/72.4 |

FOREIGN PATENT DOCUMENTS

| | | |
|---|---|---|
| CN | 1932323 A | 3/2007 |
| CN | 102242786 A | 11/2011 |
| CN | 102278398 A | 12/2011 |
| CN | 103104636 A | 5/2013 |
| DE | 198 57 074 A1 | 6/2000 |
| DE | 10 2012 006 110 A1 | 9/2013 |
| EP | 0 108 680 A1 | 5/1984 |
| EP | 2 644 928 A1 | 10/2013 |
| WO | WO 02/059494 A1 | 8/2002 |
| WO | WO 2012/167875 A1 | 12/2012 |

OTHER PUBLICATIONS

German-language Written Opinion (PCT/ISA/237) issued in PCT Application No. PCT/EP2014/071715 dated Jan. 22, 2015 (Four (4) pages).

German-language Office Action issued in counterpart German Application No. 10 2013 111 258.7 dated Aug. 7, 2014 (Four (4) pages).

International Preliminary Report on Patentability (PCT/IB/338 & PCT/IB/373) dated Apr. 21, 2016, including English translation of document C2 (German-language Written Opinion (PCT/ISA/237)) previously filed on Apr. 11, 2016 (Eight (8) pages).

Chinese-language Office Action issued in counterpart Chinese Application No. 201480055862.2 dated May 3, 2017 with English translation (Twelve (12) pages).

* cited by examiner

BRAKE CALIPER FOR A DISC BRAKE

CROSS REFERENCE TO RELATED APPLICATIONS

This application is a continuation of PCT International Application No. PCT/EP2014/071715, filed Oct. 10, 2014, which claims priority under 35 U.S.C. § 119 from German Patent Application No. 10 2013 111 258.7, filed Oct. 11, 2013, the entire disclosures of which are herein expressly incorporated by reference.

BACKGROUND AND SUMMARY OF THE INVENTION

The present invention concerns a brake caliper for a disc brake.

Such brake calipers for disc brakes are normally produced integrally by a casting process, preferably in a sand-casting process, wherein a preferred material is spheroidal graphite cast iron. The resulting blank casting is then machined by material removal to produce a brake caliper ready for installation. Such one-piece brake calipers made of spheroidal graphite cast iron according to the prior art have proved successful in principle, but have some drawbacks which have adverse effects in particular in the area of application of heavy trucks.

The disadvantages here in particular are the high process costs of the casting process, due to the great complexity of melting the casting material, removing the sand core, targeted cooling following the casting process, and cleaning the raw casting. These costs are only slightly proportional to quantity.

A disadvantage resulting from the principle of the production method of "lost mold casting" lies in the fact that a casting model is essential, so that because of the cost structure of a cast brake caliper, there is a minimum limit quantity for economic production of a cast brake caliper. Costs are also incurred by the runner system, which is admittedly returned to the melt but must be paid for.

In addition, due to the permanent loading of the casting model with molding sand, a casting model is subject to abrasive wear so that after a specific number of molding processes, it must be replaced with a new casting model. This further loads the cost structure of a cast brake caliper.

Furthermore, due to the production principle, a cast brake caliper requires minimum wall thicknesses in order to be reliably castable. This leads, in particular in regions subjected to low loads, to over-dimensioning of the material in relation to strength, leading to disadvantages for cost and weight.

Furthermore, a material-removal process is required to produce a usable brake caliper from a blank casting.

There is thus the need to provide a brake caliper, in particular for vehicle brakes, in particular for truck brakes, which at least partly overcomes the above disadvantages.

EP 0 108 680 A1 discloses a brake caliper made from two shaped components. The upper and lower components of the brake caliper each have central openings. The upper and lower components are each produced from a sheet or strip such that both have a central half-cylinder. Several smaller half-cylinders are formed in the upper and lower components, each spaced from the central half-cylinder. When the two components are joined together, the formed half-cylinders become full cylinders and can receive other components, e.g. the application actuator (hydraulic in this case) or guide pins to guide the movement of the caliper in the axial direction relative to the brake disc.

The disadvantage with the design according to EP 0 108 680 A1 is the lack of precision of the resulting receiver, in particular for guide elements.

In addition, because of the selected structure of the essential structural components, the design of portions with higher mechanical load may not be load-compatible, or only inadequately so. Thus the construction selected in EP 0 108 680 A1 is not usable or only limitedly usable for the truck sector.

The invention is therefore based on the object of providing a method for production of a brake caliper, and providing a brake caliper which avoids the disadvantages above and can be produced economically, process-reliably and hence efficiently.

This and other objects are achieved by the invention in that the housing comprises a base plate, an intermediate plate, a housing shell connecting the base plate and the intermediate plate, and the housing cover. The caliper frame is cut from a sheet metal and shaped, and the housing cover is formed integrally with the caliper frame.

The invention thus creates a brake caliper which has components created by cutting processes, or cutting and shaping processes, or cutting and joining processes, wherein the one-piece caliper frame has a housing upper part which is part of the housing of the application mechanism of the brake disc.

One advantage of a brake caliper which is preferably assembled from several components, produced either by a cutting process or by a combination of a cutting process and a shaping process, is the possibility of being able to design regions with higher or lower loading load-specifically in regard to the wall thickness and selection of material, so that the material of the respective component is optimally utilized. This is achieved e.g. by the use of a tailored blank as a starting product. This flexibility in material choice leads to substantial advantages in the weight balance and cost structure of an assembled brake caliper.

The flexibility with regard to material choice also allows for, in principle, a choice of materials with greater strength and yield strength, wherein the cost structure and above all the weight of the brake caliper can be further optimized. Here, in particular, a low weight, as well as optimum cost structure, is a predominant development target in the vehicle sector, since a higher payload for the vehicle is possible.

Due to the construction of the brake caliper from shaped components, there is a higher number of potential suppliers than for a comparable brake caliper of spheroidal graphite cast iron.

A further essential cost benefit for a brake caliper according to the invention results from the absence of a cost-intensive casting model. Due to the design, in a brake caliper according to the invention, there is no need—at least in part—for machining of a blank by material removal, which brings further cost benefits.

In addition, with a brake caliper according to the invention, the machining of a blank by material removal is not required, leading to further cost benefits.

Other objects, advantages and novel features of the present invention will become apparent from the following detailed description of one or more preferred embodiments when considered in conjunction with the accompanying drawings.

DETAILED DESCRIPTION OF THE DRAWINGS

A brake caliper 1 of a sliding caliper disc brake is described below. This is given purely as an example. A brake caliper 1 according to the invention may consequently also be used for a fixed caliper disc brake or for a floating caliper disc brake, wherein brake-specific design properties of the brake caliper 1 are adapted to the respective structure of the disc brake.

Figure 1:
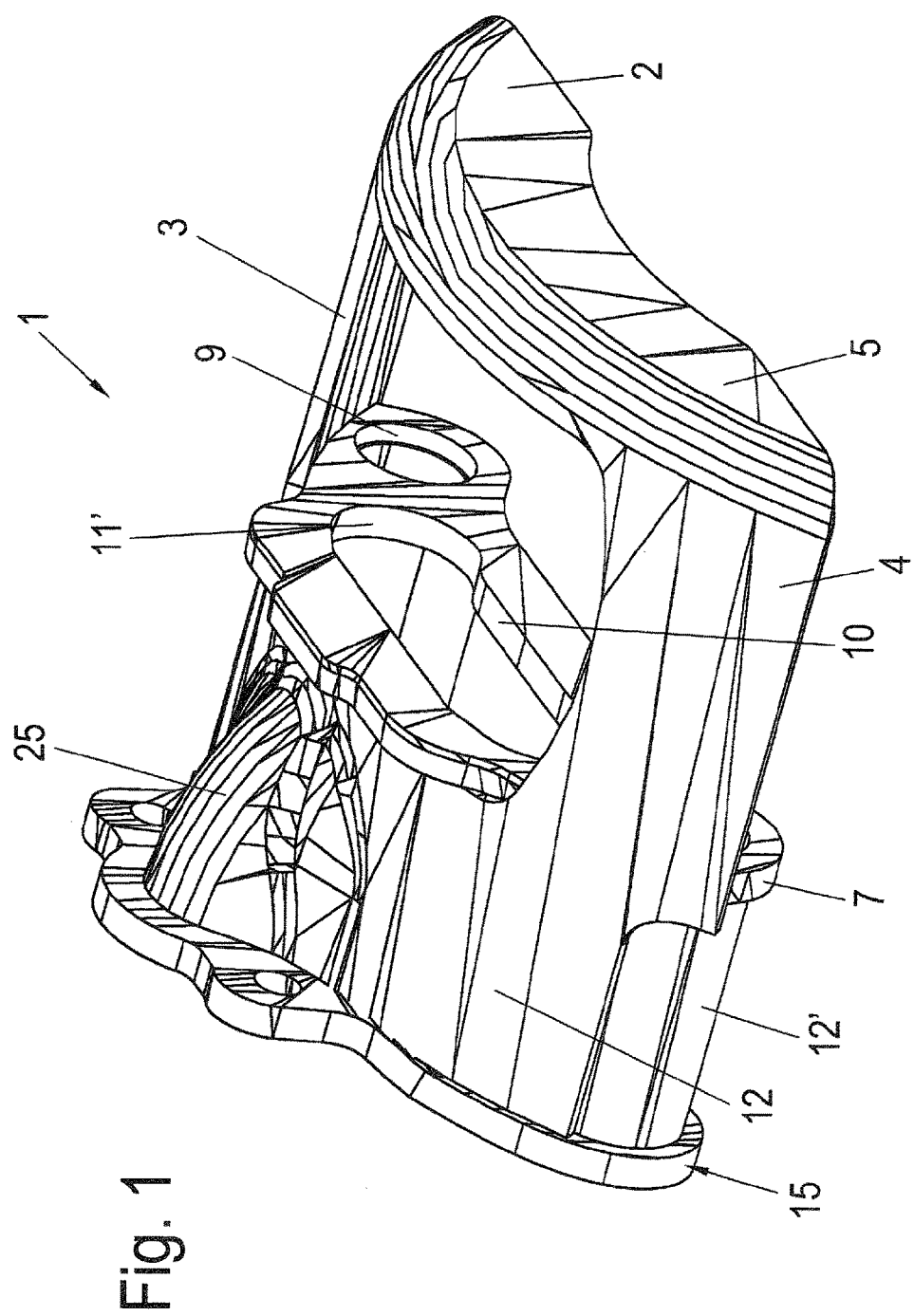
FIG. 1 is a spatial view of an embodiment variant of a brake caliper according to the invention.

FIG. 1 shows a spatial (perspective) depiction of a brake caliper 1 according to the invention of a sliding caliper disc brake. The brake caliper 1 has a bow-shaped caliper frame 2. In an installed state of the brake caliper 1, the caliper frame 2 extends over a brake disc (not shown). The brake caliper 2 has two tie bars 3, 4 extending substantially parallel to each other and to the brake disc axis. The caliper frame 2 also has a caliper back 5. The caliper frame 2 is made from a flat stock blank which is shaped into the caliper frame 2.

On the side of an intermediate plate 7 facing away from the caliper frame, the caliper frame forms a housing upper portion 12 which, together with a housing shell 12', in the installed state of the disc brake, receives an application mechanism for the disc brake. The tie bars 3, 4 of the caliper frame 2 extend over the intermediate plate 7 and abut against a base plate 15. The caliper frame 2 furthermore forms a housing cover 12 which, together with a housing shell 12', in the installed state of the disc brake, receives the application mechanism of the disc brake. The housing cover 12 substantially has a cross-section which follows the base geometry of the intermediate plate 7. The housing cover 12 partially abuts against the intermediate plate 7 on the side of the intermediate plate 7 facing away from the caliper frame, and is attached thereto by a joining process, preferably by a material-fit joining process, particularly preferably by laser welding.

In the region of the housing cover 12, the caliper frame 2 has a dome-like housing portion 25. The intermediate plate 7 and the base plate 15 are each attached to the caliper frame 2 by a joining process, preferably by a material-fit joining process, particularly preferably by laser welding.

Figure 4:
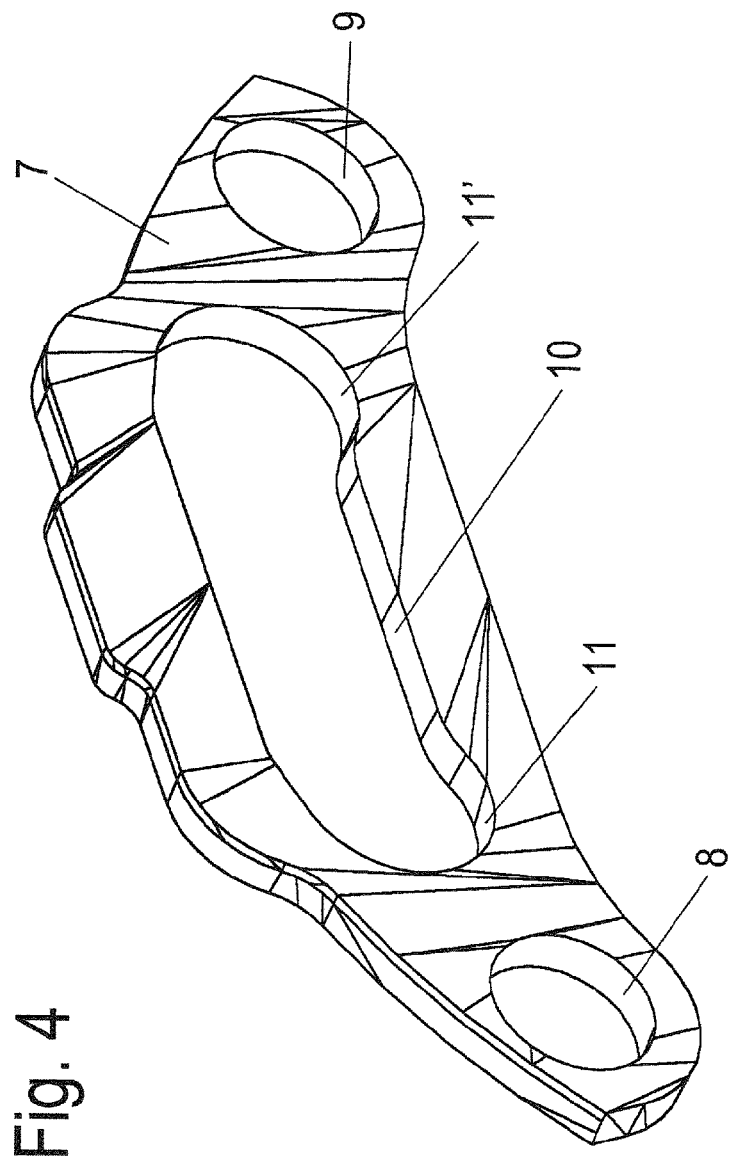
FIG. 4 is a spatial view of an intermediate plate of an embodiment variant of the brake caliper according to the invention.

The intermediate plate 7 has two bores 8, 9. In addition, the intermediate plate 7 has a symmetrical passage opening created by a connection between a central opening 10 and two bores 11, 11' lying symmetrically to the axis of symmetry. In the installed state of the disc brake, the two bores 11, 11' receive pressure elements of an application mechanism, while the opening 10 receives further function elements of the application mechanism such as e.g. an adjustment system for the brake pads to compensate for wear. The housing cover 12 also surrounds the region of the theoretical cylindrical extension of the bores 8, 9 on the side of the intermediate plate 7 facing away from the caliper frame. The intermediate plate 7 is made from a flat stock blank. The intermediate plate 7 is also shown in FIG. 4.

On the side of the housing cover 12 facing away from the intermediate plate, the housing cover 12 of the caliper frame 2 abuts against a base plate 15 and is attached to the base plate 15 by a joining process, preferably by a material-fit joining process, particularly preferably by laser welding. The base plate 15 has a bore 16 lying on the symmetry line of the base plate 15, through which a piston rod or actuator of the brake cylinder passes in mounted state of the disc brake (see FIG. 5, for example). The base plate 15 furthermore has two bores 17, 18 arranged symmetrically to the symmetry line. In addition, the base plate 15 has a plurality of bores 19 with relatively small diameter.

Figure 2:
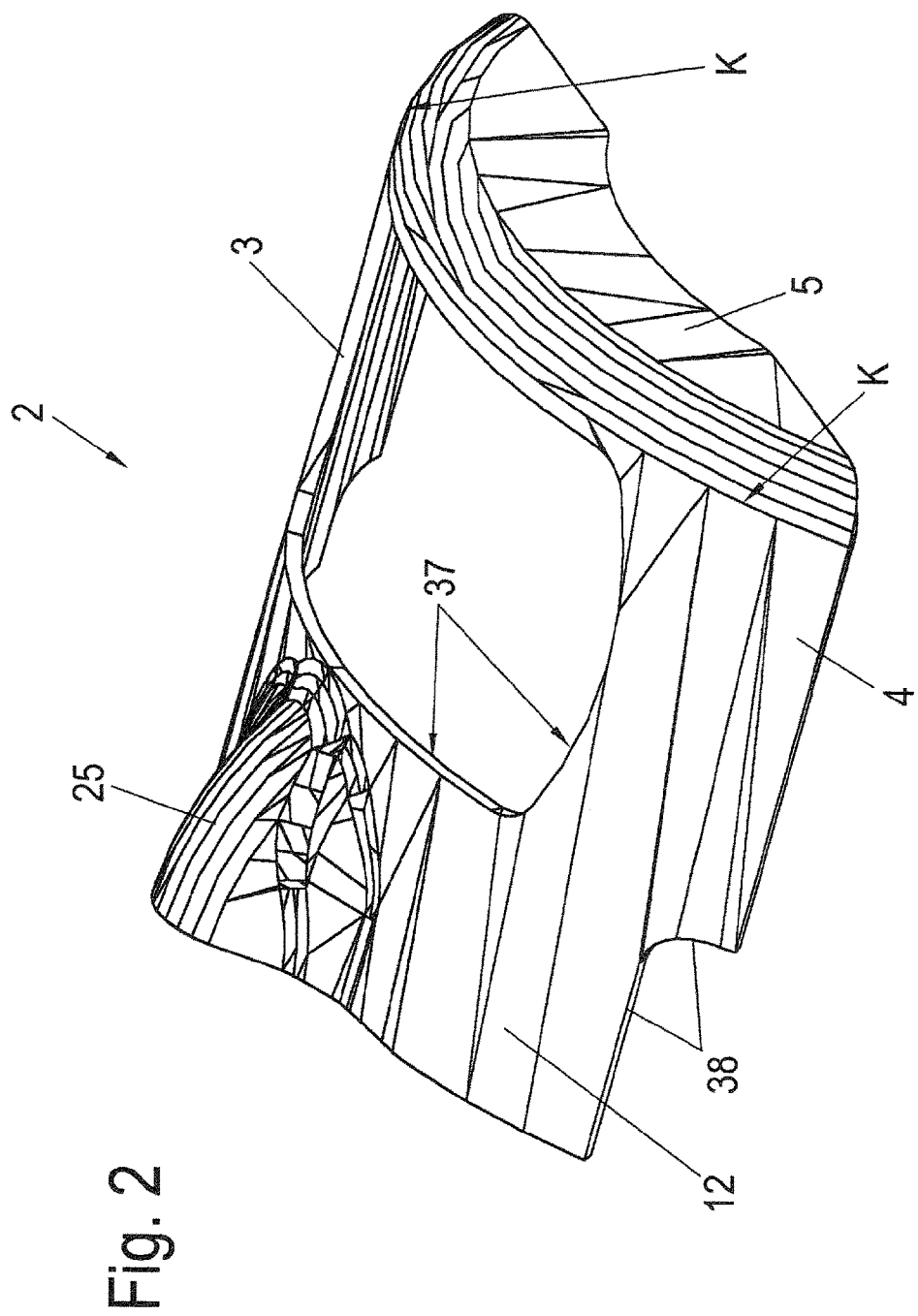
FIG. 2 is a spatial view of a caliper frame of an embodiment variant of a brake caliper according to the invention.

FIG. 2 clearly shows the caliper frame 2. The caliper frame 2 is a one-piece symmetrical component. The caliper back 5 has a base geometry substantially formed as a circle segment. This base geometry is orthogonally adjacent to the curved geometry of the caliper frame 2 in the region of the brake disc window 37, and is created by a shaping process or several shaping processes. The geometry of the two tie bars 3, 4 follows the circle segment-like base geometry of the intermediate plate 7. To this extent, the two tie bars 3, 4 and the housing cover 12 have a "K" curvature. Due to the curvature of the tie bars 3, 4, their bending stiffness is advantageously increased in comparison with a design without "K" curvature. The caliper frame 2 furthermore has a recess 38. The recess 38 creates access to the housing shell 12' so that the housing shell 12' with the caliper frame 2 can be connected to the housing cover 12 to form a housing. The caliper frame 2 is preferably manufactured by deep-drawing or die-punching of a flat stock blank. The shaping process or processes create a strain hardening in the caliper frame 2 which may have the effect of increasing the strength.

Figure 3:
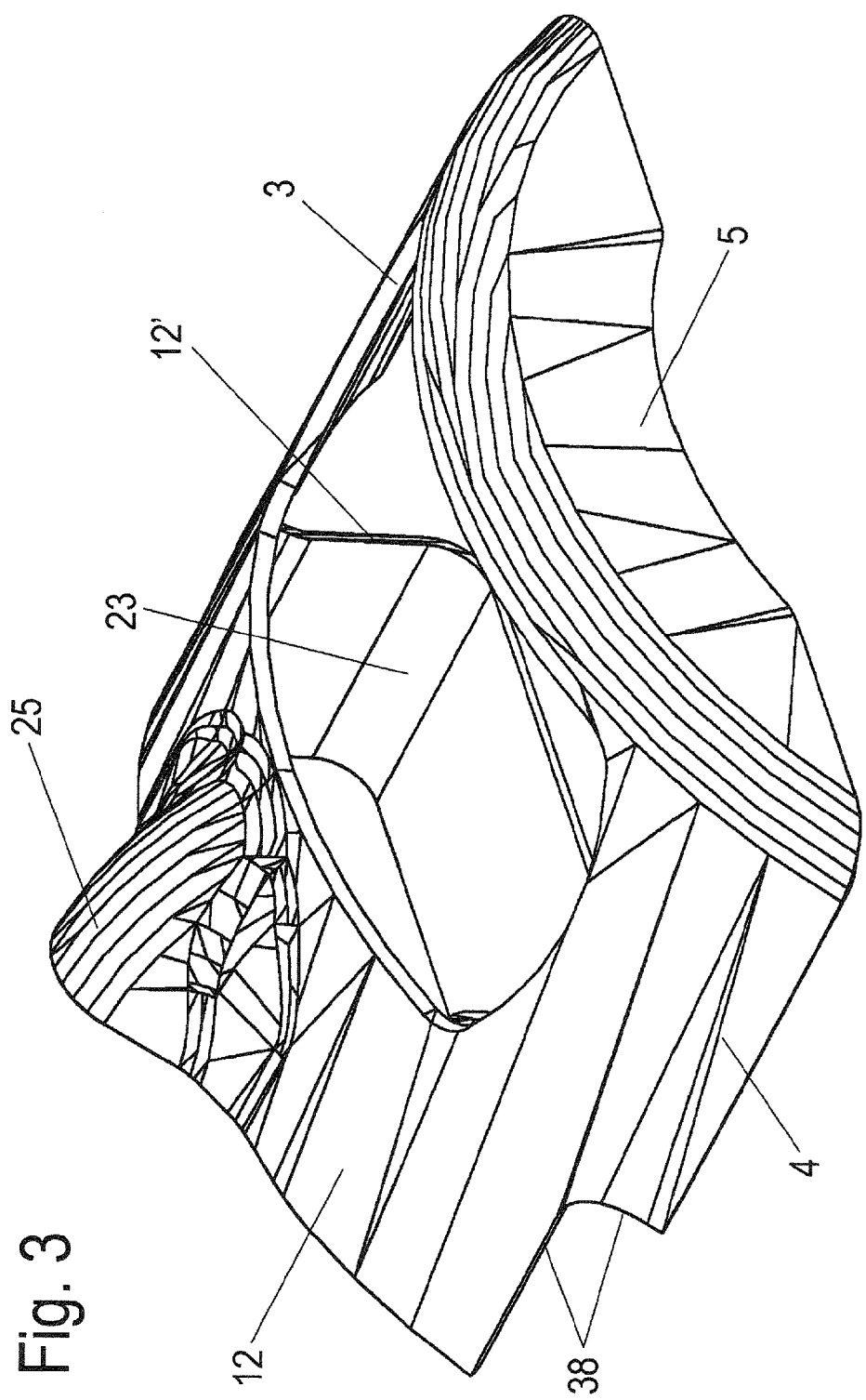
FIG. 3 is a spatial view of a housing for an application mechanism of an embodiment variant of the brake caliper according to the invention.

FIG. 3 shows the caliper frame 2 with the housing cover 12. The housing cover 12 of the caliper frame 2 and the housing shell 12' form a housing 23 which receives the application mechanism of the disc brake and is closed on its face sides by the base plate 15 and by the intermediate plate 7 (not shown here).

The dome-like housing portion 25 houses a piston rod of a brake cylinder and a lever arm of the application mechanism of the disc brake (neither shown), and follows the pivot region of the lever arm of the application mechanism of the disc brake.

Figure 5:
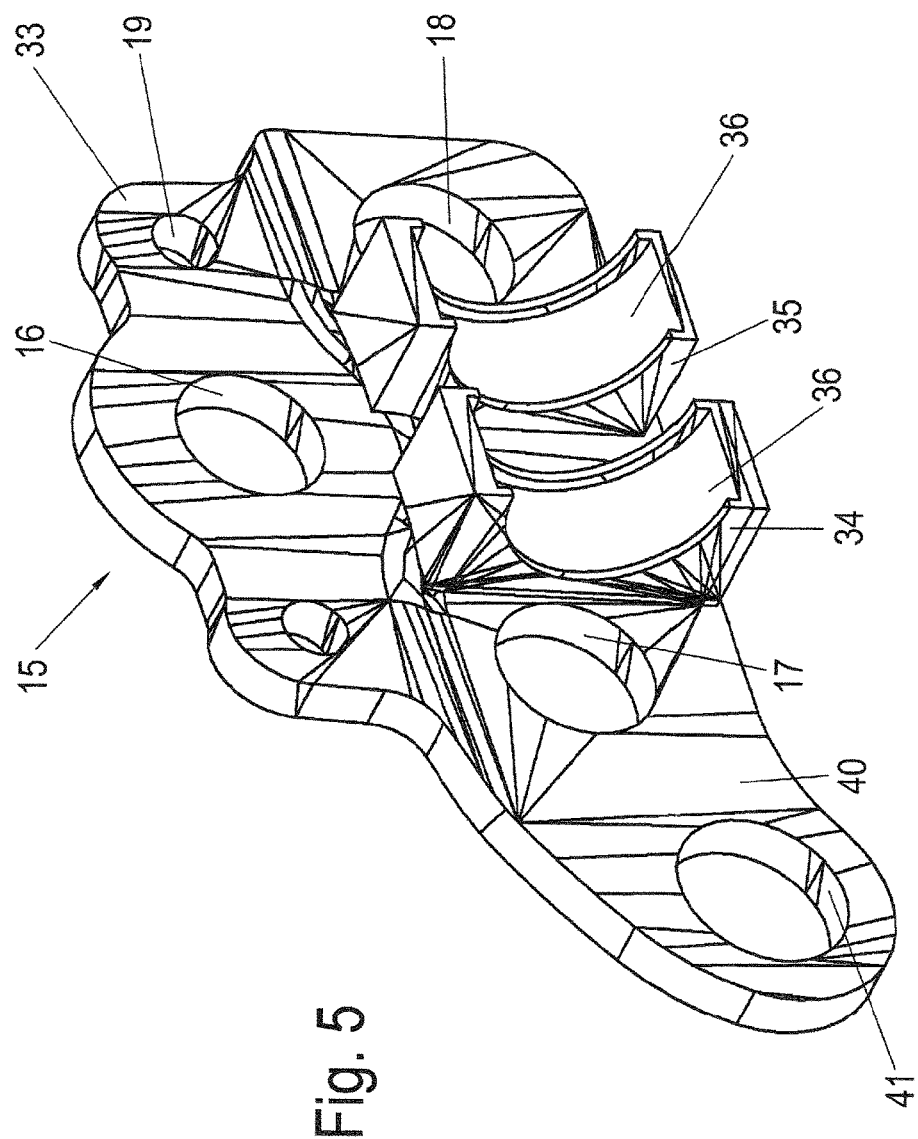
FIG. 5 is a spatial view of a base plate with bearing blocks of an embodiment variant of a brake caliper according to the invention.

FIG. 5 shows the base plate 15. The base plate 15 is a substantially symmetrical component and comprises a bed plate 33 and two bearing blocks 34, 35. A plate portion 40 is not symmetrical and has a bore 41 which forms part of the fixed bearing of a guide element (not shown).

The bearing blocks 34, 35 are each part of a split bearing housing and receive the bearing of a lever or shaft on which a lever acts (neither shown). The shaft and/or lever are part of the application mechanism of the disc brake. To receive the bearing, the bearing blocks 34, 35 each have a bearing seat 36. The bearing seat 36 is machined as a half-cylinder in each bearing block 34, 35. The bearing blocks 34, 35 are attached to the bed plate 33 by a joining process, preferably by a material-fit joining process, particularly preferably by laser welding. The bearing blocks 34, 35 are made from an easily weldable material, e.g. steel, by a material removal process. Alternatively, the bearing blocks 34, 35 may also be produced by a casting process, e.g. casting. In such a case, the material used is e.g. cast steel or weldable white malleable casting.

The respective blanks for the caliper frame 2, the intermediate plate 7, the housing 12 or the housing shell 12', and the base plate 15 or the bed plate 33 are produced—where toolless production is provided—by suitable cutting processes e.g. laser, plasma or flame cutting, or by punching, or a combination thereof. All commercial sheet semi-finished products, e.g. panels, plates, coils, strips or tailored blanks, may be used as a semi-finished product.

The material used for the respective blanks is steel, preferably an easily weldable steel type. Where tool-related production is required for the respective blanks, the blank is preferably produced in a progressive cutting tool.

Depending on the quantity required, it may also be economic to produce the entire caliper frame 2 or the complete housing 12 or the housing shell 12' in a progressive composite tool, in which the respective blank is produced— including the casting processes—in one tool, so that a caliper frame 2 or housing shell 12' leaves the tool per press stroke.

The housing shell 12' may alternatively also be produced by a roll-forming process. In this case, a corresponding profile is produced by roll-forming of a coil or strip or tailored blank and then trimmed to the necessary length of the housing shell 12'.

In the case of a tool-related production of the respective blanks or the caliper frame 2 or housing shell 12', preferably panels, plates, coils, strips or tailored blanks are used as a semi-finished product, wherein the material used is in each case steel, preferably an easily weldable steel type.

By the choice of an advantageous welding process, in particular preferably laser welding, the welding distortion can be restricted to a minimum so that there is no need for conventional measures to counter or dissipate weld stresses, such as e.g. a predefined seam tracking or stress-relief heat treatment of the joined component. This also has a positive effect on the cost structure of a brake caliper 1 according to the invention.

A brake caliper 1 according to the invention is thus formed in which, in a first method step, one or more flat stock semi-finished products are provided.

In a further method step, the intermediate plate 7 is cut from a flat stock semi-finished product.

In a subsequent method step, the bed plate 33 is cut from a flat stock semi-finished product and, together with the at least one bearing block 34, 35, joined to the base plate 15.

In a following method step, a blank of the housing shell 12' is cut from a flat stock semi-finished product and shaped into the housing shell 12'.

In a further method step, a blank of the caliper frame 2 is cut from a flat stock semi-finished product and formed into the caliper frame 2.

In a final method step, the intermediate plate 7, the base plate 15, the housing shell 12' and the caliper frame 2 are joined into the brake caliper 1.

Alternatively, the housing shell 12' is shaped from a flat stock semi-finished product by a roll-forming process and then cut into a housing shell 12'.

LIST OF REFERENCE NUMERALS

1 Brake caliper
2 Caliper frame
3 Tie bar
4 Tie bar
5 Caliper back
7 Intermediate plate
8 Bore
9 Bore
10 Bore
11 Bore
12 Housing cover
12' Housing shell
15 Base plate
16 Bore
17 Bore
18 Bore
19 Bore
23 Housing
33 Bed plate
34 Bearing block
35 Bearing block
36 Bearing seat
37 Brake disc window
38 Recess
40 Plate portion
41 Bore The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake caliper for a disc brake, comprising:
    a first caliper part including a housing cover, a caliper back, and at least one tie bar interconnecting the housing cover and the caliper back, the first caliper part forming a caliper frame configured to extend over an edge of a brake disc, and
    a second caliper part including a base plate, an intermediate plate, and a housing shell connecting the base plate and the intermediate plate, the first and second caliper parts joined together to form a housing to receive an application mechanism for application of the disc brake, wherein:
    a) the housing comprises the base plate, the intermediate plate, and the housing shell connecting the base plate and the intermediate plate of the second caliper part, and the housing cover of the first caliper part, and
    b) the first caliper part is cut from a sheet metal and shaped to integrally form the housing cover, the caliper back, and the at least one tie bar of the caliper frame.

2. The brake caliper as claimed in claim 1, wherein the base plate, the intermediate plate, the housing shell and the first caliper part are each configured as separate components which are joined together via of a joining process.

3. The brake caliper as claimed in claim 2, wherein the material-fit joining process is a welding process.

4. The brake caliper as claimed in claim 3, wherein the welding process is a laser welding process.

5. The brake caliper as claimed in claim 1, wherein a bed plate of the base plate is cut from a flat stock semi-finished product.

6. The brake caliper as claimed in claim 5, wherein the bed plate with a bearing block or a plurality of bearing blocks is joined to the base plate.

7. The brake caliper as claimed in claim 6, wherein the bearing block or bearing blocks are each made from a steel semi-finished product.

8. The brake caliper as claimed in claim 6, wherein the bearing block or bearing blocks are each made from a cast steel material.

9. The brake caliper as claimed in claim 6, wherein, by a material-fit joining process,
    the bed plate with the bearing block or the plurality of bearing blocks is joined to the base plate, and/or the intermediate plate, the base plate, the housing shell and the caliper frame are respectively joined into the brake caliper by a material-fit joining process.

10. The brake caliper as claimed in claim 1, wherein material for the housing shell is cut from a flat stock semi-finished product and then shaped to form the housing shell.

11. The brake caliper as claimed in claim 10, wherein the flat stock semi-finished product is a steel semi-finished product.

12. The brake caliper as claimed in claim 10, wherein the steel semi-finished product is a coil, a strip, a panel, a plate or a tailored blank.

13. The brake caliper as claimed in claim 1, wherein the intermediate plate is spanned by the at least one tie bar of the first caliper part.

14. The brake caliper as claimed in claim 1, wherein the intermediate plate is cut from a flat stock semi-finished product.

15. The brake caliper as claimed in claim 1, wherein the first caliper part comprises a dome-shaped housing portion, and is cut from a flat stock semi-finished product and then shaped to form the housing cover, the caliper back, and the at least one tie bar.

16. The brake caliper as claimed in claim 1, wherein a flat stock semi-finished product is subjected to a roll-forming process and then cut to form the housing shell.

17. A disc brake with a brake caliper as claimed in claim 1.

18. A method for manufacturing a brake caliper having a caliper frame with a housing, the housing including a base plate, an intermediate plate, a housing shell that connects the base plate and the intermediate plate, and a housing cover, the method comprising the acts of:
   providing a first caliper part including the housing cover, a caliper back, and at least one tie bar interconnecting the housing cover and the caliper back by cutting a blank of the caliper frame from a flat stock semi-finished product and shaping the blank into the caliper frame,
   providing a second caliper part by a) providing one or more flat stock semi-finished products; b) cutting the intermediate plate from a flat stock semi-finished product; c) cutting a bed plate from a flat stock semi-finished product and joining the bed plate having at least one bearing block to the base plate; and d) cutting a blank of the housing shell from a flat stock semi-finished product and shaping the blank into the housing shell, and
   joining the intermediate plate, the base plate, the housing shell and the caliper frame to produce the brake caliper from the first and second caliper parts.

19. The method as claimed in claim 18, wherein, in step d), the housing shell is shaped from a flat stock semi-finished product by a roll-forming process and then cut.

20. A brake caliper produced according to the method of claim 18.

* * * * *